Figure 1:
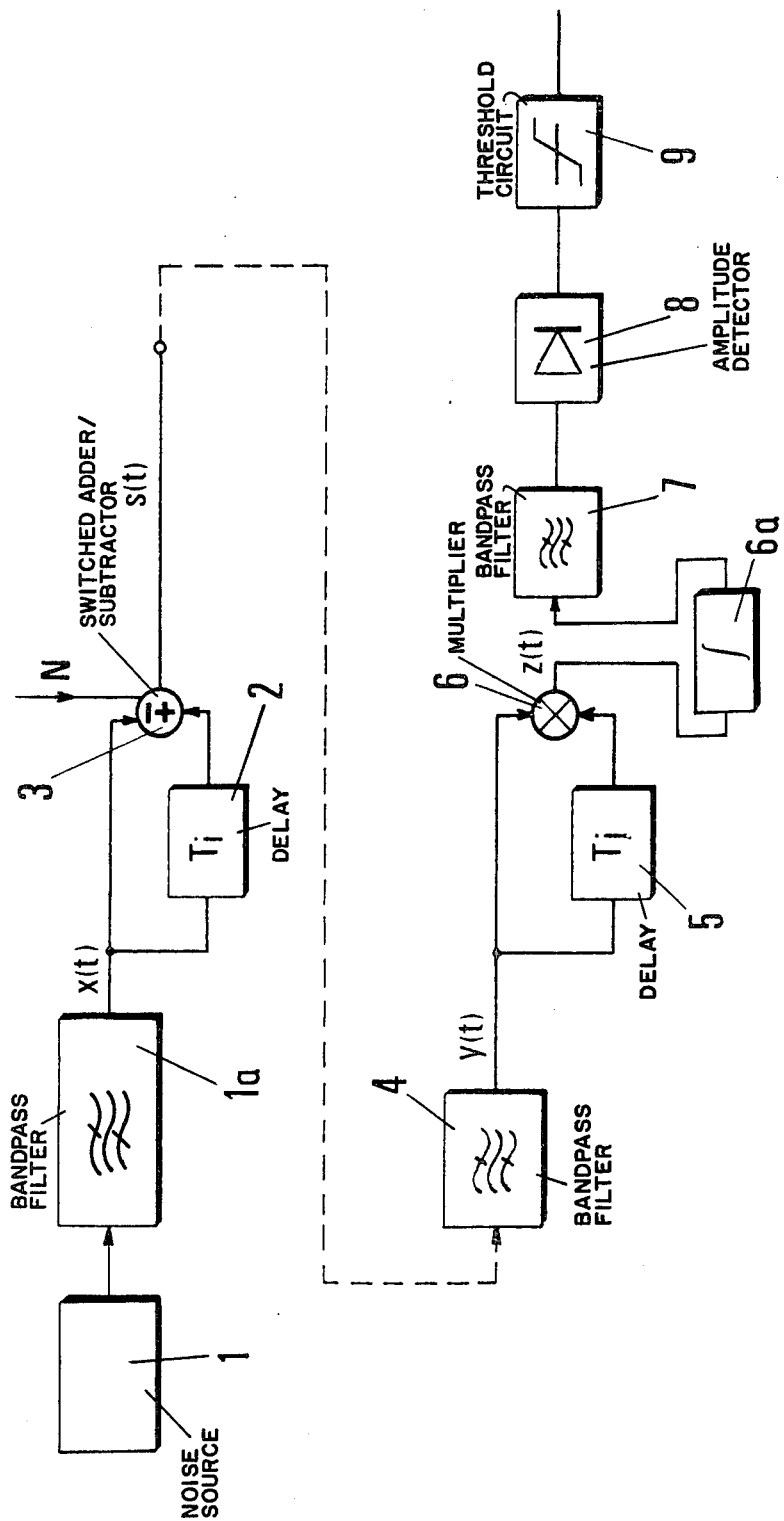

United States Patent [19]

Henry et al.

[11] 4,197,499

[45] Apr. 8, 1980

[54] TELECONTROL MESSAGE TRANSMISSION SYSTEM

[75] Inventors: Michel B. F. Henry, L'Isle Adam; Louis M. P. d'Izarny-Gargas, Versailles; André Robert, Eaubonne, all of France

[73] Assignee: Societe Anonyme de Telecommunications, Paris, France

[21] Appl. No.: 965,864

[22] Filed: Dec. 4, 1978

Related U.S. Application Data

[63] Continuation-in-part of Ser. No. 796,981, May 16, 1977, abandoned.

[51] Int. Cl.² ............................................. H04B 15/04
[52] U.S. Cl. ..................................... 340/694; 364/819
[58] Field of Search .................. 325/32, 26, 122, 132, 325/42, 64, 65, 37; 343/225; 178/22; 179/15 BY, 15 BC, 1.5 R; 364/819

[56] References Cited

U.S. PATENT DOCUMENTS

| | | | |
|---|---|---|---|
| 3,337,803 | 8/1967 | Costas et al. | 325/65 |
| 3,876,620 | 2/1975 | Coor | 364/819 |
| 4,065,718 | 12/1977 | Attwood | 325/65 |

*Primary Examiner*—Marc E. Bookbinder
*Attorney, Agent, or Firm*—Jacobs & Jacobs

[57] ABSTRACT

A telecontrol order transmission system having at the transmitting end a source, for generating ergodic random signals $x(t)$, a circuit for alternately delivering the sum and the difference of signals $x(t)$ and $x(t-T_1)$, which circuit is switched at the rate of a frequency $f_c$ and, at the receiving end, a multiplier multiplies a received signal by said received signal delayed by time lapse $T_i$, an integrator for time averaging the output of said multiplier, a band-pass filter with a narrow bandwidth centered about frequency $f_c$, connected to the output of said integrator, and a circuit for deriving a telecontrol order from the output of said filter.

2 Claims, 3 Drawing Figures

TELECONTROL MESSAGE TRANSMISSION SYSTEM

This application is a continuation-in-part of application Ser. No. 796,981, filed May 16, 1977, and now abandoned.

The present invention relates to a telecontrol message transmission system utilizing the correlation detection method.

The correlation detection transmission method is well known and comprises transmitting a signal obtained by the addition of a random signal x(t) with same delayed by a time lapse $T_i$, namely $x(t-T_i)$ and, at the receiving end, filtering the autocorrelation signal obtained by multiplication of the received signal with the latter delayed by the time lapse $T_i$.

Such a method, however, fails to free from sine signals originating from jammers. Such signals generate at the output of the autocorrelating circuit a continuous term of substantial power from which the term corresponding to the message cannot be discriminated.

The object of the invention is to provide a correlation detection transmission system free from the recited defect.

There is provided according to the invention a telecontrol order transmission system comprising, at the transmitting end, means for generating ergodic random signals x(t), circuit means for alternately delivering the sum and the difference of signals x(t) and $x(t-T_i)$, said circuit means being switched at the rate of a frequency $f_c$ and, at the receiving end, multiplier means for multiplying the received signal by said received signal delayed at time lapse $T_i$, integrator means for time averaging the output of said multiplier, a band-pass filter with a narrow bandwidth centered about frequency $f_c$, connected to the output of said integrator means, and means for deriving a telecontrol order from the output of said filter.

The output of said integrator means is therefore an alternating signal $\pm R_x(O)$, with $R_x(O)$ being the correlation function of signal x(t), and such a signal is very easy to discriminate from the continuous signal originating from a jammer by means of a filter of frequency $f_c$ and of narrow bandwidth.

The invention will be better understood from the following description, taken in conjunction with the drawing.

Figure 2:
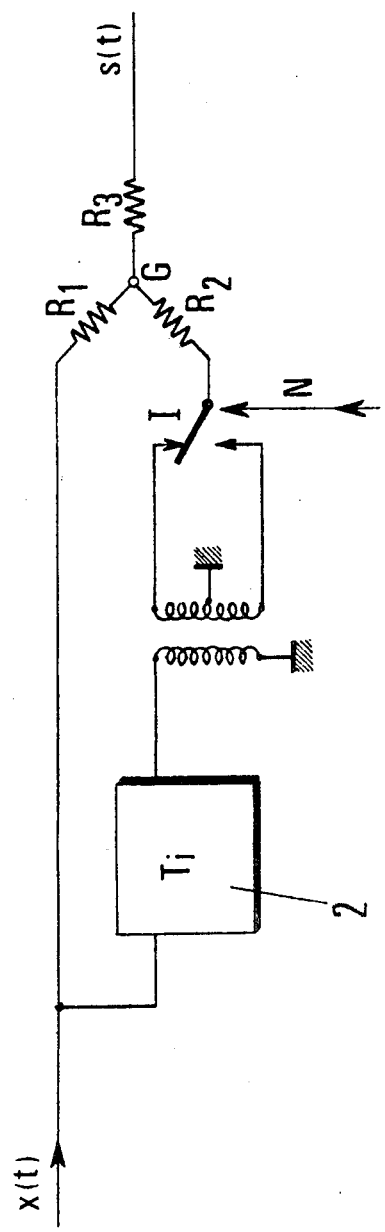
Figure 3:
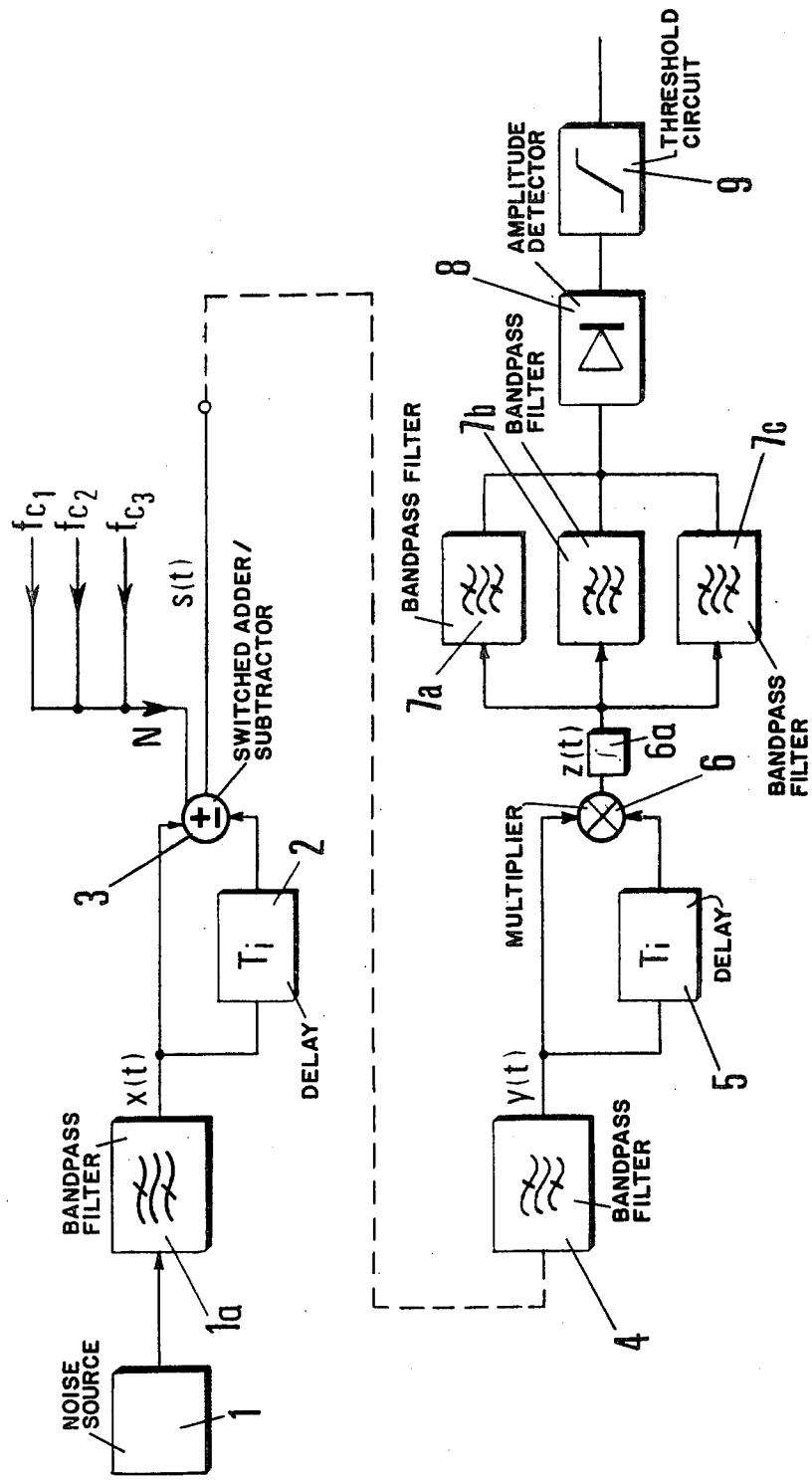

In the drawing:

FIG. 1 shows in diagrammatic form a transmission system in accordance with the invention, FIG. 2 shows in detail the switching means provided at the transmitting end, and FIG. 3 shows diagrammatically a system for transmitting m telecontrol orders.

Referring to FIG. 1, a noise generator 1 delivers an ergodic stationnary wide spectrum noise signal which is applied to a band-pass filter 1a having a bandwidth B centered about a frequency $f_o$. The output x(t) of filter 1a has a spectral density $S_x(f)$ and an autocorrelation function $R_x(\tau)$ expressed by the known relations $$S_x(f) = \frac{S_o}{2} \text{ if } f_o - \frac{B}{2} \leq f \leq f_o + \frac{B}{2}$$

$$R_x(\tau) = S_o B \frac{\sin \pi B \tau}{\pi B \tau} \cos 2\pi f_o \tau$$

Signal x(t) from filter 1a is passed through a delay line 2 to be delayed by a time $T_i$. Time $T_i$ will be chosen far greater than 1/B to facilitate the correlation detection.

The delayed signal $x(t-T_i)$ is alternately added to, and subtracted from signal x(t) directly derived from filter 1a in an adder-subtracter 3 which is switched at the rate of a signal N of frequency $f_c$, $f_c$ being very small as compared with $1/T_i$. The resulting signal s(t) is transmitted and then passed at the receiving end through a band-pass filter 4 with a bandwidth B centered about frequency $f_o$.

Signal y(t) from filter 4 and same delayed by time $T_i$ in a delay line 5 are applied to multiplier 6 which effects the product $y(t) \cdot y(t-T_i)$ and thus delivers signal z(t). An integrator 6a derives the expectation value E(z(t)) from said product signal z(t), bearing in mind that signal x(t) is ergodic. Thus, the time average derived by the integrator is identical with the expectation value.

While device 3 adds x(t) and $x(t-T_i)$ at the transmitting end, the average value of signal z(t) is $$E(z(T)) = E(y(t) \cdot y(t-T_i)) = R_x(O)$$

While device 3 subtracts $x(t-T_i)$ from x(t) from the average value of signal z(t) is $$E(z(t)) = -R_x(O)$$

The output of integrator 6a therefore a squarewave signal with an amplitude of $\pm R_x(O)$.

The signal z(t) is passed through a band-pass filter 7 having a bandwidth b centered about frequency $f_c$ very narrow as compared with B. Filter 7 yields at its output a sine signal whose power is known to be $(8/\pi 2)[R_x(O)]^2$.

It will be understood that a jamming signal in sine wave form would not interfere with the detection of the telecontrol message. Such a jamming signal would furnish at the output of multiplier 6 a continuous signal which is not capable of interfering with alternating signal z(t) and which is filtered off by filter 7.

The following values are indicated to illustrate the invention:

$f_o = 10$ MHz, $B = 500$ kHz
$f_c = 90$ Hz, $b = 12,5$ Hz

Conventional amplitude detector 8 and threshold circuit 9 are provided at the output of filter 7 to produce a voltage signal usable as a telecontrol voltage. The voltage thus derived may be applied to e.g. a relay or other switching element to produce a telecontrol order.

FIG. 2 shows in more detailed manner an embodiment of the delay line 2 and adder-subtracter 3. Signals x(t) and $x(t-T_i)$ are added or subtracted at a point G of a resistor arrangement and the resulting signal s(t) is transmitted after frequency transposition is achieved. A switch I actuated by an order signal N with a frequency $f_c$ passes alternately $x(t-T_i)$ and $-x(t-T_i)$. Switch I connects point G alternately to the two terminals of the secondary winding of a transformer having its center earthed.

It might be contemplated to use time $T_i$ as the parameter indicative of the telecontrol message. Times $T_i$, however, have to be of great value, which involves technological difficulties in respect of delay lines.

It is therefore preferred to employ a switching frequency as such a parameter. This is shown in FIG. 3.

Assuming that $f_{c1}$, $F_{c2}$, $F_{c3}$... are frequencies, selected among m frequencies, which are available to switch device 3, a telecontrol order will be defined by means of the frequency passed by respective filters 7a, 7b, 7c... arranged in parallel at the output of integrator 6a.

What we claim is:

1. A control signal transmission system comprising, at the transmitting end, means for generating ergodic random signals x(t), circuit means for alternatively delivering the sum and the difference of signals x(t) and x(t−$T_i$), said circuit means being switched at the rate of a frequency $f_c$ and, at the receiving end, delay and multiplier means for multiplying a received signal by said received signal delayed by time lapse $T_i$, integrator means for time averaging the output of said delay and multiplier means, a band-pass filter with a narrow bandwidth centered about frequency $f_c$, connected to the output of said integrator means, and means for deriving a control signal from the output of said filter.

2. A system according to claim 1, wherein one switching frequency $f_{ci}$ among m frequencies is selected and, at the receiving end, m band-pass filters for passage of each respective frequency $f_{ci}$ are arranged in parallel at the output of said integrator means.

* * * * *